United States Patent
Farrell et al.

(10) Patent No.: US 12,511,398 B2
(45) Date of Patent: Dec. 30, 2025

(54) VEHICLE COMPUTER SYSTEM AND METHOD

(71) Applicant: GM Global Technology Operations LLC, Detroit, MI (US)

(72) Inventors: Brian Farrell, Troy, MI (US); John Jen, Carmel, IN (US); J. David Rosa, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 18/503,938

(22) Filed: Nov. 7, 2023

(65) Prior Publication Data

US 2025/0148083 A1    May 8, 2025

(51) Int. Cl.
  G06F 21/57 (2013.01)
  G06F 8/65 (2018.01)

(52) U.S. Cl.
  CPC ........... G06F 21/572 (2013.01); G06F 8/65 (2013.01); G06F 21/575 (2013.01); *G06F 2221/033* (2013.01)

(58) Field of Classification Search
  CPC ........ G06F 21/572; G06F 8/65; G06F 21/575; G06F 2221/033
  See application file for complete search history.

(56) References Cited

U.S. PATENT DOCUMENTS

| | | | | |
|---|---|---|---|---|
| 10,244,394 B2 * | 3/2019 | Stumpf | .................. | H04L 9/3213 |
| 10,614,220 B2 * | 4/2020 | Shin | ........................ | G06F 21/74 |
| 11,089,016 B2 * | 8/2021 | Kim | .................. | G06K 19/07372 |
| 12,117,920 B2 * | 10/2024 | Kojima | ............... | G06F 11/3608 |
| 2020/0104211 A1 * | 4/2020 | Obayashi | ............ | G06F 11/1417 |
| 2021/0406380 A1 * | 12/2021 | Poulard | .................... | G06F 21/74 |

(Continued)

FOREIGN PATENT DOCUMENTS

| | | | | |
|---|---|---|---|---|
| CN | 109933348 A | * | 6/2019 | |
| CN | 119397541 A | * | 2/2025 | ............. G06F 8/658 |
| DE | 102019216462 A1 | | 4/2021 | |
| DE | 102020207863 A1 | | 12/2021 | |
| DE | 102022202688 A1 | | 9/2023 | |
| DE | 102022202691 A1 | | 9/2023 | |
| EP | 3570193 A1 | * | 11/2019 | ............. G06F 21/44 |

OTHER PUBLICATIONS

Morgan, Gary et al., elektroniknet.de, Integrating new concepts into AUTOSAR, retreived electronically on Jul. 12, 2024 from <https://www.elektroniknet.de/automotive/software-tools/neue-konzepte-in-autosar-einbinden.110621.html>, published Jul. 3, 2014.

(Continued)

*Primary Examiner* — Christopher A Revak
(74) *Attorney, Agent, or Firm* — Honigman LLP; Matthew H. Szalach; Jonathan P. O'Brien (57) ABSTRACT

A system may include data processing hardware and memory hardware in communication with the data processing hardware. The memory hardware may store instructions that when executed on the data processing hardware cause the data processing hardware to perform operations. The operations include requesting, via a boot manager of a host module, a hardware security module (HSM) to verify an application software of the host module and configuring, via the verified application software, a memory protection unit (MPU) to at least one of no execute and no write for at least one area of a memory of the host module. The operations further include executing the application software with the HSM enabled.

17 Claims, 7 Drawing Sheets

(56) References Cited

U.S. PATENT DOCUMENTS

| | | | |
|---|---|---|---|
| 2022/0366053 A1* | 11/2022 | Jung | G06F 21/575 |
| 2023/0073884 A1* | 3/2023 | Farrell | G06F 21/54 |
| 2023/0229780 A1* | 7/2023 | Usami | G06F 21/575 |
| | | | 726/26 |
| 2025/0005160 A1* | 1/2025 | Jayaramareddy | G06F 8/65 |

OTHER PUBLICATIONS

Infineon, Automotive Cyber Security Compendium, Infineon Microcontroller AURIXTm, retrieved from the internet on Jul. 3, 2024 <https://www.allaboutcircuits.com/uploads/articles/Infineon-ATV_Cyber_Security_Compendium_Public-Whitepaper-v01_00-EN.pdf>, Infineon Technologies AG, Munich, Germany, Oct. 2019, 26 pages.

International Standard ISO 26262-6 Dec. 2018. Road vehicles-Functional safety—Part 6: Product development at the software level, 2nd Edition, ISO Dec. 2018.

Nasser, Ahmad MK, Securing safety critical automotive systems, Retrieved from the internet on Jul. 2, 2024, <https://deepblue.lib.umich.edu/bitstream/handle/2027.42/152,321/Ahmad%20Nasser%20Final%20Thesis%20%281%29.pdf?sequence=1>, University of Michigan—Dearborn, 2019.

Palmucci, L., A novel open-source HSM Firmware compatible with AUTOSAR specifications for Secure Hardware Extensions, Master's Degree Thesis, Politecnico Di Torino, Jul. 2023, retrieved from the internet on Jul. 2, 2024 <https://webthesis.biblio.polito.it/27682/1/tesi.pdf>.

* cited by examiner

VEHICLE COMPUTER SYSTEM AND METHOD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle computer system and method to prevent tampering of software during runtime.

Secure boot is a security control that is often utilized for embedded devices. The secure boot is configured to ensure that only authentic software is executed by the respective embedded device. The authenticity of the software is typically verified by the secure boot at each startup. However, the software may be modified during a runtime of the software without detection, when the software is only authenticated at the startup. For example, the device is typically configured to independently power-down, such that if the previously authenticated software is modified, then the device may not power-down to reset and stop potential execution of malware.

SUMMARY

In some aspects, a computer-implemented method when executed by data processing hardware causes the data processing hardware to perform operations including receiving code from a flash memory at a hardware security module (HSM), verifying an authenticity of the code via the HSM, and initiating a host module in response to the verified code, the host module including a boot manager, a bootloader, and application software. The operations also include receiving a programming session request at the boot manager to execute the bootloader and configuring, via the bootloader, a memory protection unit (MPU) to at least one of no write and no execute for at least one area of a memory of the host module. The programming session is executed to modify the memory of the host module and update the application software of the host module using the verified bootloader, and a microcontroller including the HSM and the host module is reset to execute the updated application software of the host module.

In some examples, initiating the host module may include determining, via the boot manager, which of the bootloader and the application software to execute and verifying the bootloader by the HSM includes allowing modification of the memory of the host module except at a location of the bootloader and preventing modification of the memory of the host module before executing the programming session request. Optionally, configuring the MPU may include setting a stack area and a data area of the memory of the host module to no execute via the MPU and setting a holding area of the memory of the host module to no write and no execute via the MPU. The microcontroller may be reset by completing the programming session and entering the application software.

In some implementations, executing the programming session request may include disabling a protection feature of the HSM, the protection feature may be configured to protect the memory of the host module, and executing updates to a code area of the memory. The holding area of the memory may be set by setting a first holding area to no write and no execute and a second holding area to no write and no execute. The first holding area may defined between the stack area and the data area and the second holding area may be defined between the data area and the code area. In some instances, executing the programming session may include triggering a reset at one of the first holding area and the second holding area in response to a write overflow of data. Optionally, the bootloader may be verified by the HSM by receiving, from the boot manager, a location and length of the bootloader and generating a key for the bootloader.

In other aspects, a system may include data processing hardware and memory hardware in communication with the data processing hardware. The memory hardware may store instructions that when executed on the data processing hardware cause the data processing hardware to perform operations. The operations include requesting, via a boot manager of a host module, a hardware security module (HSM) to verify an application software of the host module and configuring, via the verified application software, a memory protection unit (MPU) to at least one of no execute and no write for at least one area of a memory of the host module. The operations further include executing the application software with the HSM enabled.

In some examples, configuring the MPU may include setting a stack area and a data area to no execute and setting a holding area to no write and no execute. Setting the holding area of the memory may include setting a first holding area to no write and no execute and a second holding area to no write and no execute. The first holding area may be defined between the stack area and the data area and the second holding area may be defined between the data area and a code area. In some implementations, the operations may include receiving a programming session request at the HSM and flagging the programming session request at the host module to request execution of a bootloader of the host module and resetting a microcontroller and verifying the bootloader by the HSM in response to the programming session request. The operations may also include (i) disabling a protection feature of the HSM, the protection feature may be configured to protect the memory of the host module, (ii) executing the programming session request to modify the memory of the host module and update the application software using the verified bootloader, and (iii) resetting the microcontroller including the HSM and the host module to execute the updated application software of the host module. Optionally, the operations may include initiating the host module and preventing, via the HSM, modification of the memory of the host module by the host module.

In yet other aspects, a vehicle may include an electronic control unit (ECU) configured to receive programming session requests including executable code and a microcontroller communicatively coupled to the ECU. The microcontroller including data processing hardware and memory hardware. The memory hardware stores a hardware security module (HSM), a host module, and a memory protection unit (MPU), and the HSM is configured to cause the data processing hardware to perform operations. The operations include initiating the host module. The host module includes a boot manager, a bootloader, and application software. The operations also include determining, via the boot manager, which of the bootloader and the application software to execute and verifying, via the HSM, at least one of the bootloader and the application software. The operations further include configuring, via one of the bootloader and the application software, the memory protection unit (MPU) to at least one of no write and no execute for at least one area of a memory of the host module and executing one of the bootloader and the application software via the host module.

In some examples, the operations may include receiving, at the HSM, and verifying, via the HSM, a programming session request including the executable code and verifying at least one of the bootloader and the application software includes verifying the bootloader via the HSM in response to the programming session request. Optionally, initiating the host module may include restricting, via the HSM, modification permissions of the memory of the host module. In some implementations, configuring the MPU may include setting a stack area and a data area of the memory of the host module to no write and no execute and setting a holding area to no write and no execute. The holding area may be defined between the stack area and a code area of the memory of the host module.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a vehicle 100 includes an electronic control unit (ECU) 10 configured to execute functional software modules of the vehicle 100. The vehicle 100 of the present application may be an electric vehicle (EV) such that the vehicle 100 is powered by one or more electric motors (none shown). Additionally or alternatively, the vehicle 100 may be powered by an internal combustion engine (ICE) and/or may be a hybrid EV with an ICE. It is contemplated that the functional software modules of the ECU 10 may assist in executing functions of the vehicle 100. For example, the functional software modules may include, in one example, a brake module configured to execute algorithms associated with braking or otherwise slowing propulsion of the vehicle 100.

Although the ECU 10 is described herein with respect to a vehicle 100, it is also contemplated that the ECU 10 may be utilized in non-vehicle settings. For example, the ECU 10 may be incorporated into various electronic-based devices that utilize a controller to execute software. The ECU 10 according to the present disclosure is configured to prevent tampering of software during a runtime of the ECU 10. For example, the system and method described herein is configured to prevent unauthorized changes to the ECU 10.

Thus, any practicable device, including a vehicle 100 equipped with the ECU 10, may utilize the system and method described herein.

Figure 1:
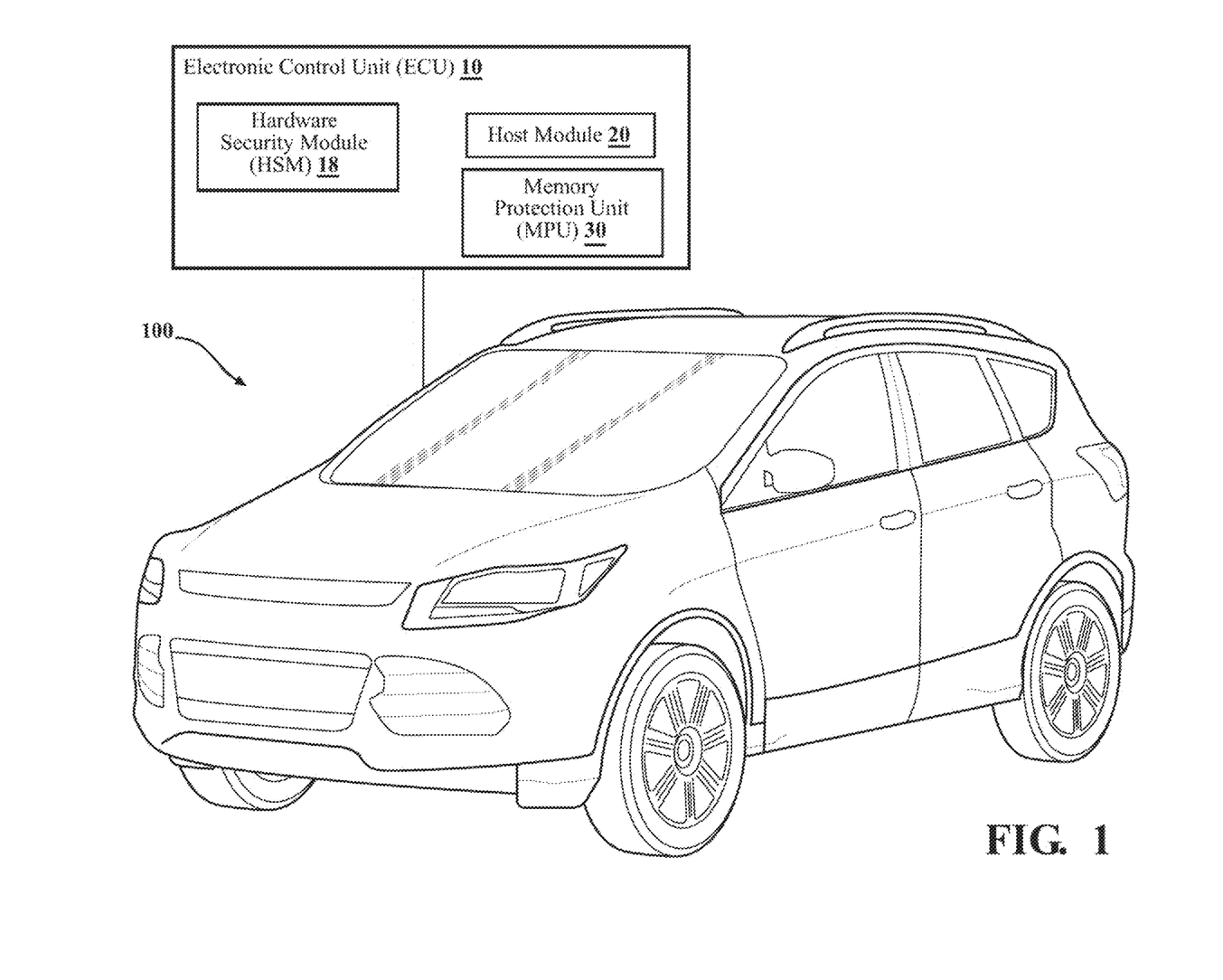
FIG. 1 is a perspective view of a vehicle with a hardware security module and a host module according to the present disclosure.
Figure 2:
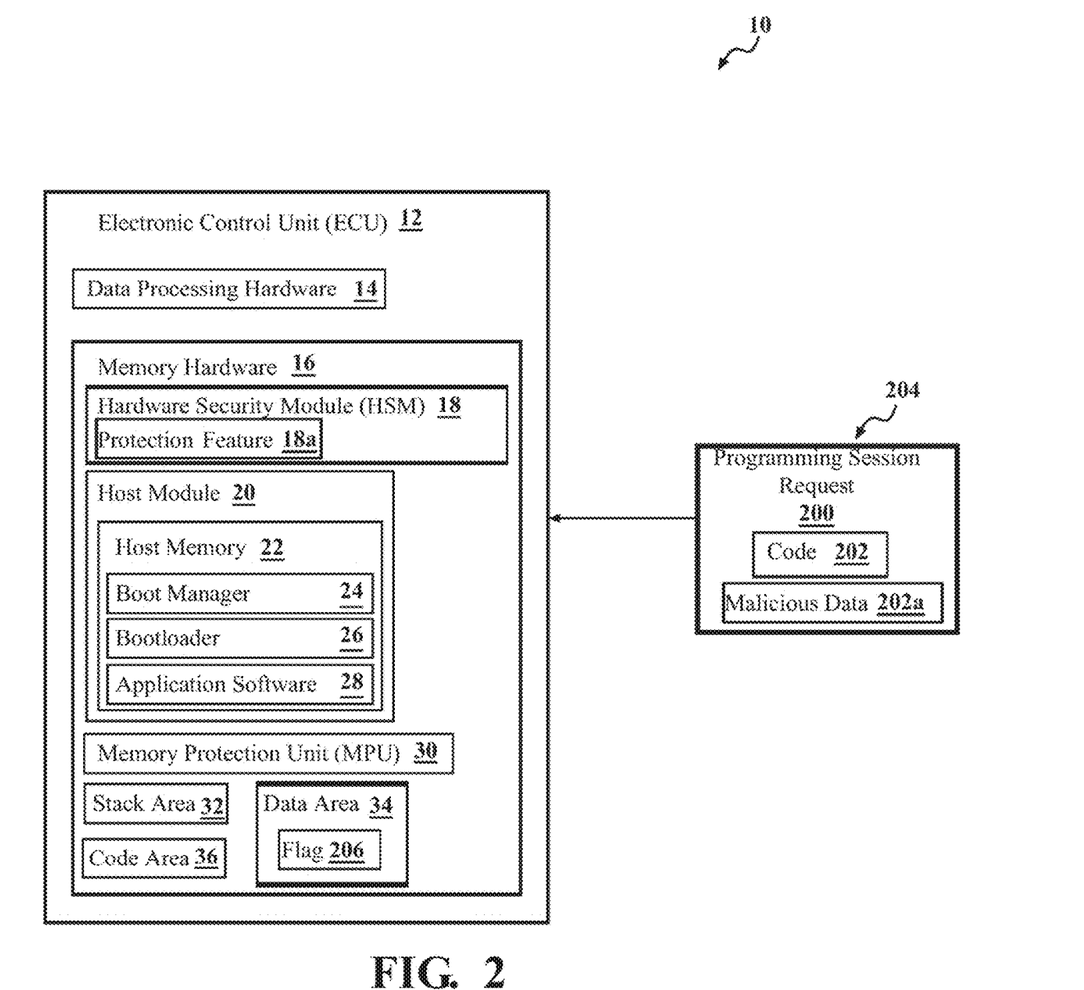
FIG. 2 is an example box diagram of a secure boot system for an electronic control unit of a vehicle according to the present disclosure.
Figure 3:
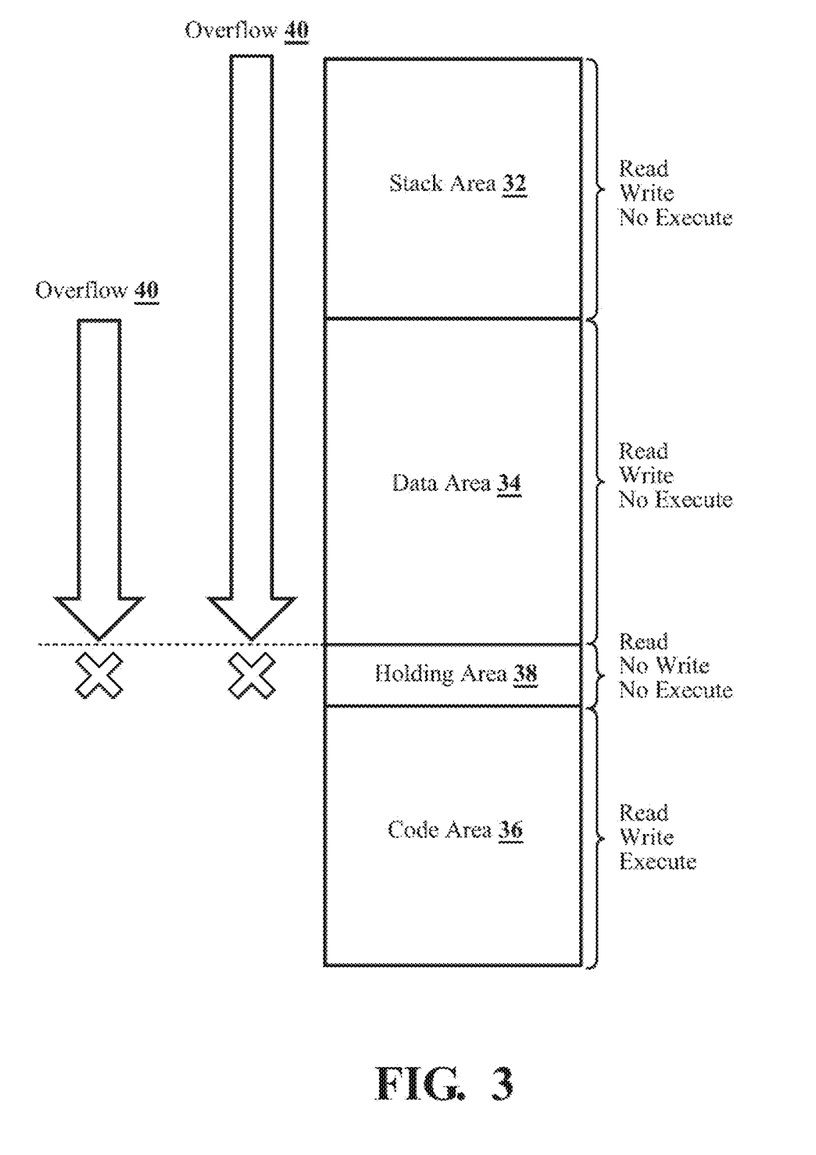
FIG. 3 is an example schematic of an execution of an electronic control unit (ECU) system according to the present disclosure.
Figure 4:
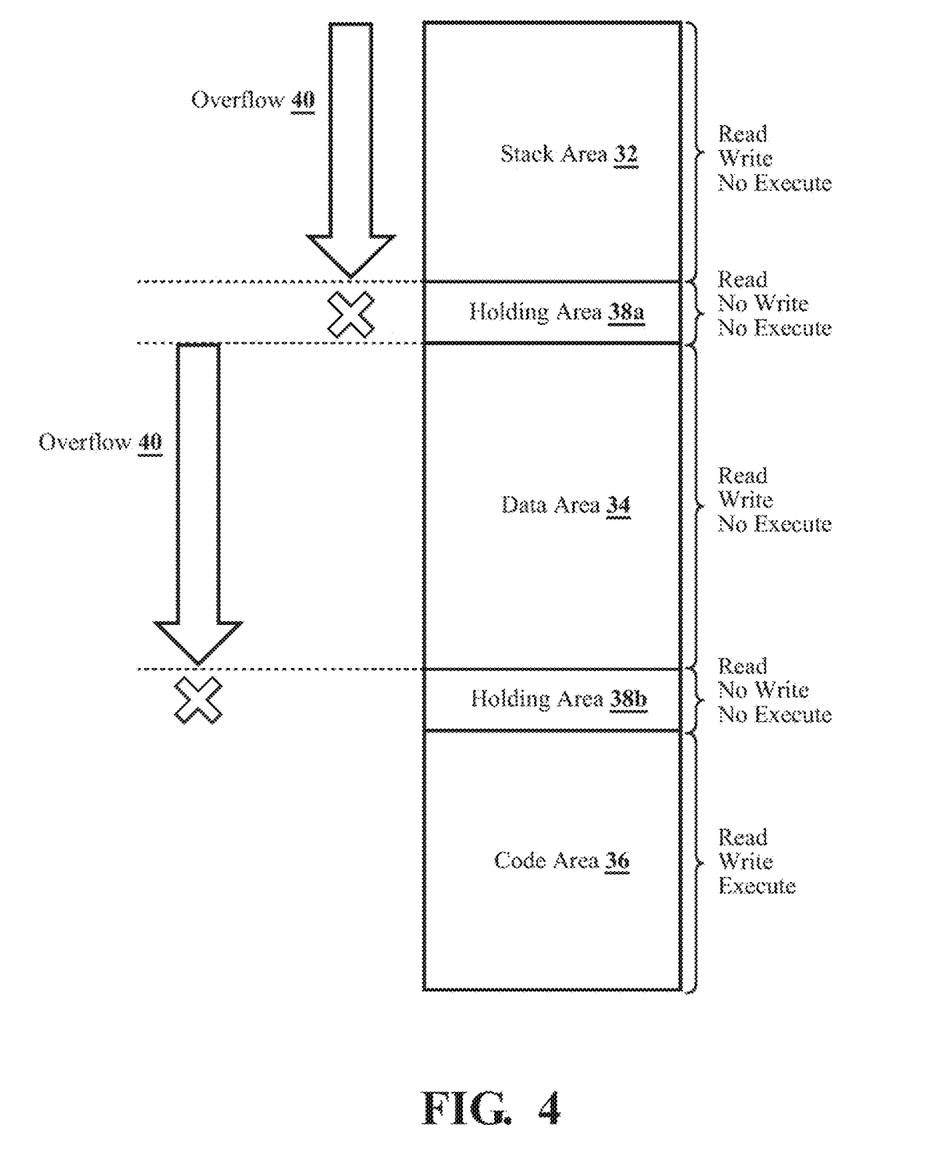
FIG. 4 is another example schematic of an execution of an ECU system according to the present disclosure.

With further reference to FIGS. 1 and 2, the ECU 10 includes one or more microcontrollers 12. The microcontrollers 12 are configured to execute code and run software to execute the functions of the ECU 10. The microcontrollers 12 are equipped with data processing hardware 14 and memory hardware 16. The data processing hardware 14 is configured to execute operations stored on the memory hardware 16 in response to a programming session request 200. For example, the microcontroller 12 may receive an executable code 202 as part of a programming session request 200, which triggers a series of operations to be performed by the data processing hardware 14. The memory hardware 16 stores a hardware security module (HSM) 18, which includes a protection feature 18*a*, and a host module 20. The protection feature 18*a* of the HSM 18 is configured to protect the host module 20. The HSM 18 cooperates with the data processing hardware 14 to execute the operations described herein. Additionally or alternatively, the data processing hardware 14 may be utilized in operating the software of the microcontroller 12 in combination with supporting the operation of the HSM 18 and host module 20.

While the HSM 18 is part of the microcontroller 12, the HSM 18 is configured with a processor and a memory specific to the HSM 18. The processor of the HSM 18 runs a small amount of code, which is isolated from external sources, such that the HSM 18 is secured from potential external manipulation. The HSM 18 may also store one or more secret keys to communicate with other ECUs in the vehicle 100 and may contain cryptographic algorithms to secure communication with the other ECUs. The HSM 18 is configured to provide an initial security wall for the memory hardware 16, such that the HSM 18 is configured to validate the executable code 202 received as part of the programming session request 200. The programming session request 200 is received from an external source relative to the ECU 10 and is subsequently verified by the HSM 18.

Referring now to FIGS. 1-4, the HSM 18 receives the executable code 202 from flash memory 204 and verifies an authenticity of the code 202 before initiating the host module 20. The flash memory 204 may be an external flash and/or an internal flash. For example, the HSM 18 may read the code 202 from the internal flash memory 204. As described below, the internal flash memory 204 may correspond to a host memory 22 of the host module 20. If the HSM 18 determines that the code 202 is corrupt or has otherwise been manipulated, then the HSM 18 will reset the microcontroller 12, and in some instances the ECU 10, to eliminate the corrupt code 202. If the HSM 18 validates the code 202, then the HSM 18 initiates the host module 20. Although described in a sequential manner, it is contemplated that the HSM 18 may simultaneously validate the code 202 and initiate the host module 20. When the host module 20 is initiated, the HSM 18 restricts modification permissions of the host module 20, as described in more detail below. The host memory 22 includes a boot manager 24, a bootloader 26, and application software 28.

If the HSM 18 and the host module 20 are executed simultaneously, the host module 20 will first execute the boot manager 24 by one time programmable (OTP) memory. The OTP memory includes a secure code for the boot manager 24 that is secured from external sources. Once the HSM 18 has verified the code 202, the boot manager 24 determines which of the bootloader 26 and the application software 28 to run. Both the bootloader 26 and the application software 28 interface with external sources, such that it is advantageous to mitigate risks associated with potential vulnerabilities of each of the bootloader 26 and the application software 28. The microcontroller 12 utilizes the HSM 18 and a memory protection unit (MPU) 30 to execute various protection protocols to minimize any potential vulnerabilities of the bootloader 26 and the application software 28, as described in more detail below.

Referring still to FIGS. 1-4, the memory hardware 16 of the microcontroller 12 is configured to be selectively modified to incorporate the code 202. The areas of the memory hardware 16 include a stack area 32, a data area 34, a code area 36, and one or more holding areas 38 defined therebetween. The stack area 32 is an area of the memory hardware 16 where temporary variables are stored, and the data area 34 stores global variables of the ECU 10. For example, once the HSM 18 has verified the code 202, the application software 28 sets a flag 206 in the data area 34 of the memory hardware 16, as described in more detail below. The holding areas 38 may include a first holding area 38*a* defined between the stack area 32 and a second holding area 38*b* defined between the data area 34 and the code area 36. Additionally or alternatively, the memory hardware 16 may have a single holding area 38 defined between the data area 34 and the code area 36 depending on the configuration of the memory hardware 16.

The holding areas 38 are configured to provide a trigger for the microcontroller 12 in the event of an overflow 40. The overflow 40 may occur during a write operation at either of the stack area 32 and the data area 34. Thus, the overflow 40 may be referred to as a write overflow 40. The overflow 40 is an abnormal response to the write operation, such that data 202*a* (e.g., malicious code) that is being written into the respective area 32, 34, 36 is corrupt. The holding areas 38 are configured as read-only, such that no write or execute functions are allowed at the holding areas 38. Accordingly, any attempt to continue writing the data 202*a* at the holding area 38 will trigger a reset of the microcontroller 12 and ECU 10. The reset will wipe the data 202*a* from the memory hardware 16, including the host memory 22.

Referring to FIGS. 1-4, the boot manager 24 of the host module 20 determines, in response to the flag 206 in the data area 34 of the memory hardware 16, whether to execute the bootloader 26 or the application software 28. For example, the boot manager 24 may receive the programming session request 200 to execute bootloader 26. It is contemplated that the bootloader 26 and the application software 28 run separate from one another, such that when the one of the bootloader 26 and the application software 28 is executed the other is in standby. The bootloader 26 is configured to onboard the new code 202 from the programming session request 200, while the application software 28 is configured to run the software for the microcontroller 12 and the ECU 10.

In one example, the boot manager 24 determines that the bootloader 26 should run. For example, if the application software 28 is invalid or not programmed, then the boot manager 24 determines the bootloader 26 should run. In another example, the boot manager 24 may determine the bootloader 26 should run in response to the programming session request 200. After the boot manager 24 determines to run the bootloader 26, the bootloader 26 is verified by the HSM 18 prior to execution of the bootloader 26. The HSM 18 generates a code to check and verify that the bootloader 26 has not been modified. For example, the HSM 18 receives a location and a length of the bootloader 26 from the boot manager 24 and may generate a secret key, which may otherwise be undetected by a third party gaining access to the memory hardware 16.

Verification by the HSM 18 ensures that the bootloader 26 is free from malware or other unauthorized modifications prior to the HSM 18 allowing the bootloader 26 to write the new code 202 into the host memory 22. Once the HSM 18 verifies the bootloader 26, the HSM 18 permits the boot manager 24 to run the bootloader 26. The verification of the bootloader 26 permits the bootloader 26 to modify the host memory 22 except at a location of the bootloader 26. In addition to the verification of the bootloader 26 by the HSM 18, the MPU 30 is configured to prohibit write and execution for at least one area of the host memory 22. For example, the stack area 32 and the data area 34 are set to no execute, and the holding areas 38 are set to no write and no execute, as mentioned above.

With further reference to FIGS. 1-4, the bootloader 26 may write the code 202 into the code area 36. In order to execute the code 202 in the code area 36, the MPU 30 is configured to allow execution from this area. The HSM 18 controls access to and modification rights to the memory hardware 16, including the host memory 22. Thus, temporarily disabling the protection feature 18a of the HSM 18 to allow the bootloader 26 to modify the code 202 in the host memory 22 and/or the memory hardware 16. As generally noted above, the protection feature 18a of the HSM 18 is configured to protect the host memory 22 of the host module 20. Thus, the protection feature 18a is disabled prior to executing the programming session request 200. The verified bootloader 26 may execute the programming session request 200 to modify the host memory 22 and update, in one example, the application software 28.

As generally mentioned above, if the bootloader 26 is writing data 202a in one of the stack area 32 and the data area 34 and an overflow 40 occurs, then the holding areas 38 will automatically trigger a reset of the microcontroller 12 and ECU 10 to wipe the data 202a from the memory hardware 16. Thus, the holding areas 38 prevent the malicious code from accessing the code area 36. Once the bootloader 26 has completed an update to the host memory 22, the bootloader 26 will execute a reset of the microcontroller 12 and ECU 10 to execute the newly updated software. In some examples, the newly updated software is the application software 28. In other examples, the newly updated software may include, but is not limited to, calibration data, an update to the HSM 18, and any other practicable software update for the host module 20, the microcontroller 12, and the ECU 10. Resetting the microcontroller 12, including the HSM 18 and the host module 20, executes the updated application software 28 and completes the programming session request 200 by entering the application software 28.

Referring still to FIGS. 1-4, the microcontroller 12 may, in some examples, determine to run the application software 28. The bootloader 26 is utilized to configure new updates, such as code and/or software updates for the memory hardware 16 and/or host memory 22. Stated differently, the bootloader 26 remains idle unless the programming session request 200 is received. Thus, often times the boot manager 24 may determine that the application software 28 should run rather than the bootloader 26. In this example, the boot manager 24 requests verification of the application software 28 by the HSM 18, similar to the bootloader 26 verification described above. The boot manager 24 is authorized to run the application software 28 once verified by the HSM 18.

As similarly described above, the MPU 30 is configured to set the stack area 32 and the data area 34 to no execute, while setting the holding areas 38 to no write and no execute. The configuration of the MPU 30 provides a failsafe in the event of any potential vulnerabilities existing in the application software 28. In addition to the MPU 30 being configured to control the write and execute privileges, the HSM 18 remains enabled during the runtime of the application software 28. Thus, the host memory 22 and/or the memory hardware 16 cannot be modified during the runtime of the application software 28, unlike the bootloader 26. As the code area 36 is set to read, write, and execute in order to run the application software 28, the HSM 18 protects the code area 22, 36 from being modified by malicious attacks that may occur during the runtime of the application software 28. The MPU 30 further supports the HSM 18 in protecting the code area 36 by limiting the write and execution privileges within the various areas of the memory 16, 22.

If the ECU 10 receives a programming session request 200, then a flag is set to perform a reset. For example, the programming session request 200 is flagged at the host module 20 in order to request execution of the bootloader 26. In response to the flag, the application software 28 will reset the microcontroller 12 and/or ECU 10 and initiate the protocol associated with the bootloader 26, as described above. For example, the programming session request 200 is executed to modify the memory 16, 22 and update the application software 28 using the verified bootloader 26. Once the bootloader 26 has completed the update, the microcontroller is reset to execute the updated application software 28.

The application software 28 may continually run until an update request is received. For example, the programming session request 200 is an update request that would trigger a reset to execute the bootloader 26 and stop the application software 28. The operations described herein may reset in a power-on state, an extreme deep sleep of the ECU 10 and/or microcontroller 12, and a detected vulnerability exploitation, such as an MPU 30 violation. An interrupt of the microcontroller 12 triggers a reset to restart the system as a whole. The HSM 18 is configured to continuously protect the code area 22 of the memory hardware 16, with the exception of the HSM 18 disabling write protection during operation of the bootloader 26. Thus, when the application software 28 is executed, the HSM 18 memory protection remains enabled.

Figure 5:
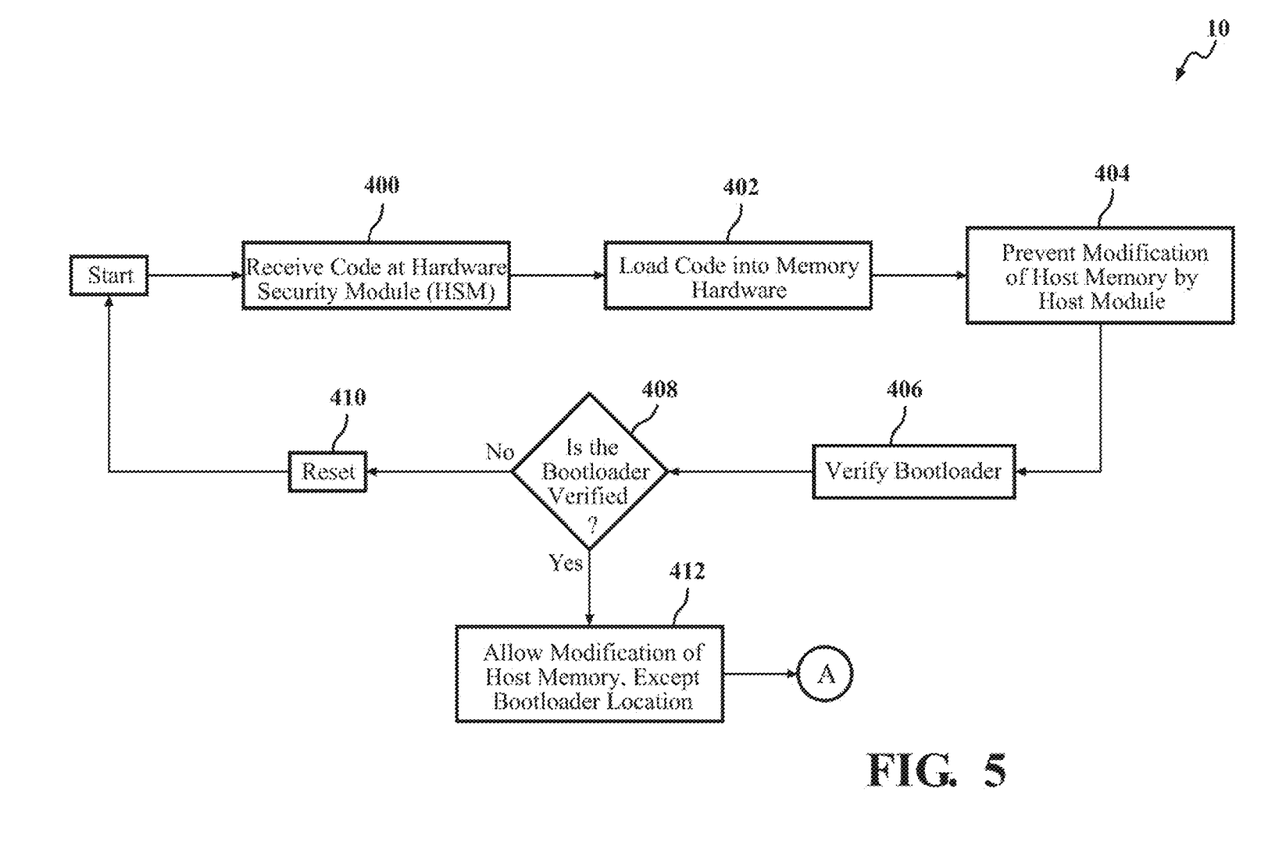
FIG. 5 is an example flow diagram for an ECU according to the present disclosure.
Figure 6:
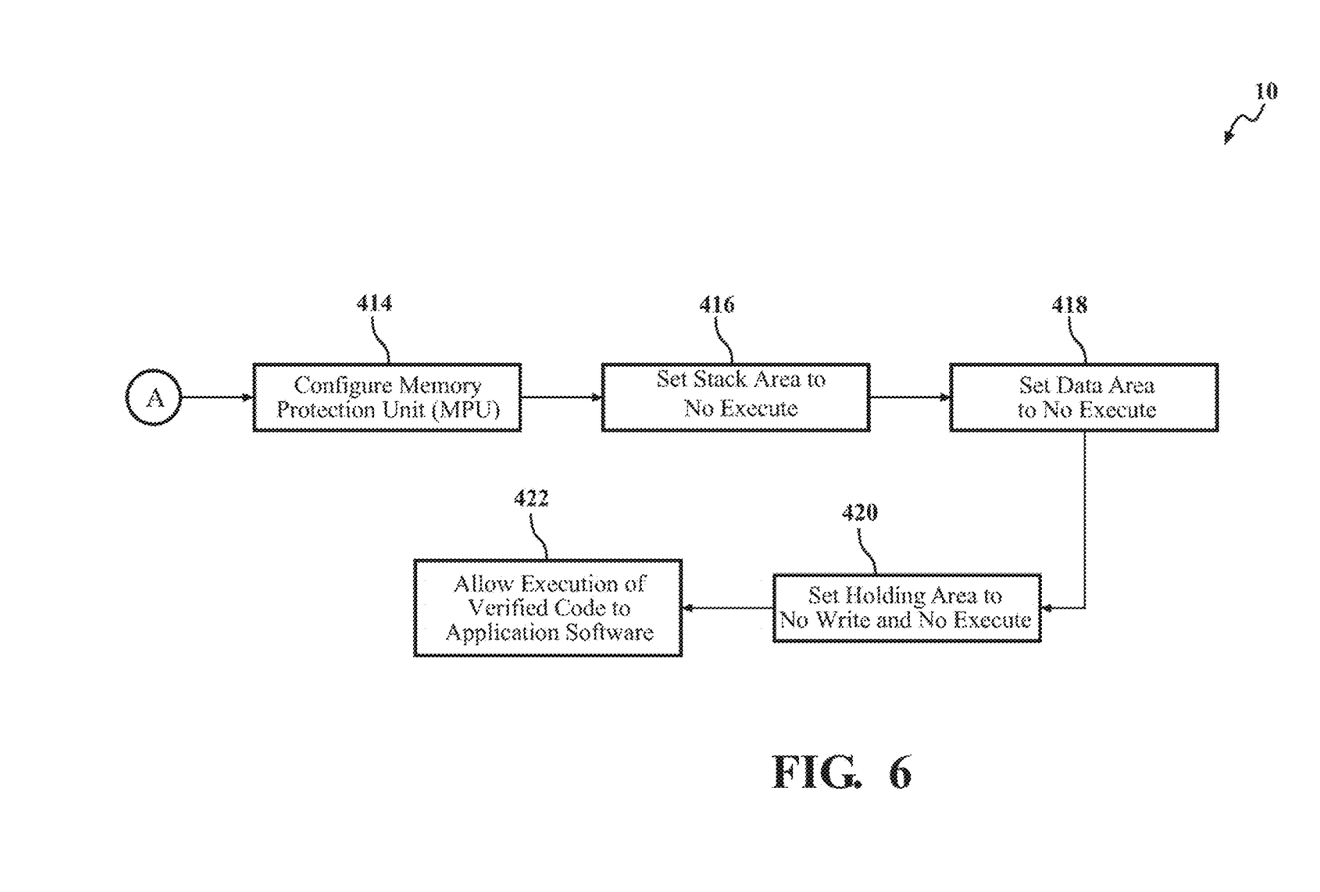
FIG. 6 is another example flow diagram for the ECU of FIG. 5.
Figure 7:
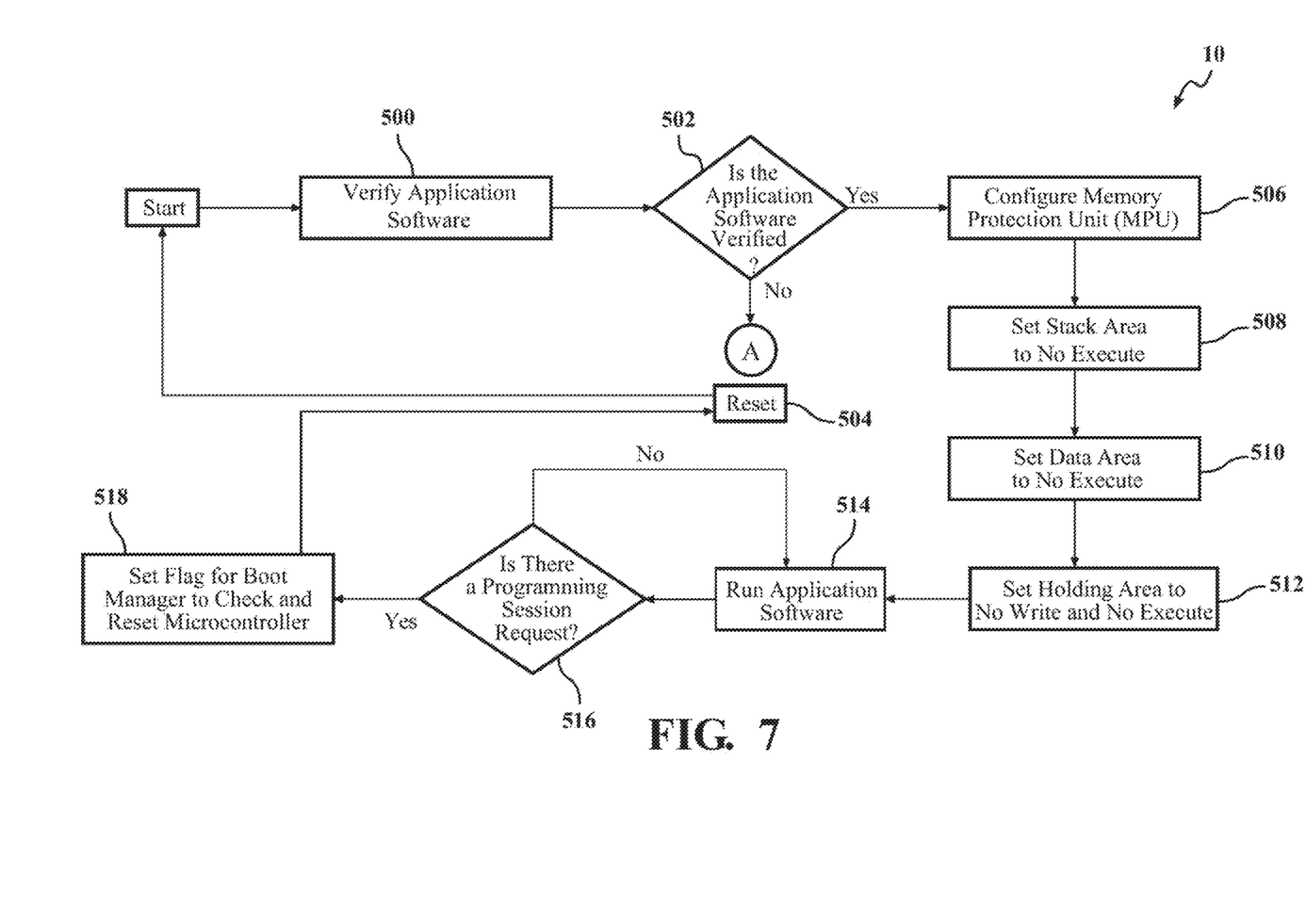
FIG. 7 is an example flow diagram for an ECU according to the present disclosure.

Referring now to FIGS. 5-7, an example flow diagram of the system for the ECU 10 described herein is illustrated. At 400, the HSM 18 receives the code 202 and, at 402, loads the code 202 onto the memory hardware 16. The HSM 18, at 404, prevents the host module 20 from modifying the host memory 22. If the application software 28 is invalid or not yet programmed or in response to a programming session request 200, the HSM 18 then, at 406, verifies the bootloader 26. The boot manager 24 determines, at 408, whether the bootloader 26 was verified by the HSM 18. If the bootloader 26 is not verified, then the boot manager 24, at 410, resets the microcontroller 12. If the bootloader 26 is verified, then the bootloader 26 is permitted, at 412, to modify the host memory 22, except at a location of the bootloader 26. At 414, the MPU 30 is configured, and at 416 and 418, the stack area 32 and the data area 34 are set to no execute in response to the configured MPU 30. At 420, the holding area is set to no write and no execute in response to the configured MPU 30. Finally, the verified code 202 may be entered and executed into the host memory 22 by the bootloader 26.

In another example flow diagram, the process of executing the application software 28 is described. At 500, the HSM 18 verifies the application software 28. The boot manager 24 determines, at 502, whether the application software 28 is verified. If the application software 28 is not verified, then the microcontroller 12 verifies the bootloader 26, as described with respect to steps 408 and 412 above. If the application software 28 is verified, then the MPU 30, at 506, is configured. It is also contemplated that the MPU 30 may be configured by the application software 28 when the application software 28 first executes. At 508 and 510, each of the stack area 32 and the data area 34 are set to no execute, and at 512, the holding areas 38 are set to no write and no execute. The application software 28 is, at 514, authorized to run. The application software 28 may subsequently determine, at 516, whether there is a valid programming session request 200. If there is no valid programming session request 200, then the application software 28 continues to run. If there is a valid programming session request 200, then the application software 28 sets a flag 206, at 518, for the boot manager 24 to check and reset the microcontroller 12.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:
   receiving code from a flash memory at a hardware security module (HSM);
   verifying an authenticity of the code via the HSM;
   initiating a host module in response to the verified code, the host module including a boot manager, a bootloader, and application software;
   receiving a programming session request at the boot manager to execute the bootloader;
   verifying the bootloader by the HSM in response to the programming session request;
   configuring, via the bootloader, a memory protection unit (MPU) to at least one of no write and no execute for at least one area of a memory of the host module;
   executing the programming session request to modify the memory of the host module and update the application software of the host module using the verified bootloader; and
   resetting a microcontroller including the HSM and the host module to execute the updated application software of the host module.

2. The method of claim 1, wherein initiating the host module includes determining, via the boot manager, which of the bootloader and the application software to execute.

3. The method of claim 2, wherein verifying the bootloader by the HSM includes allowing modification of the memory of the host module except at a location of the bootloader and preventing modification of the memory of the host module before executing the programming session request.

4. The method of claim 1, wherein configuring the MPU includes setting a stack area and a data area of the memory of the host module to no execute via the MPU and setting a holding area of the memory of the host module to no write and no execute via the MPU.

5. The method of claim 4, wherein resetting the microcontroller includes completing the programming session and entering the application software.

6. The method of claim 4, wherein executing the programming session request includes disabling a protection feature of the HSM, the protection feature being configured to protect the memory of the host module, and executing updates to a code area of the memory.

7. The method of claim 6, wherein setting the holding area of the memory includes setting a first holding area to no write and no execute and a second holding area to no write and no execute, the first holding area defined between the stack area and the data area and the second holding area defined between the data area and the code area.

8. The method of claim 7, wherein executing the programming session request includes triggering a reset at one of the first holding area and the second holding area in response to a write overflow of data.

9. The method of claim 1, wherein verifying the bootloader by the HSM includes receiving, from the boot manager, a location and length of the bootloader and generating a key for the bootloader.

10. A system comprising:
    data processing hardware; and
    memory hardware in communication with the data processing hardware, the memory hardware storing instructions that when executed on the data processing hardware cause the data processing hardware to perform operations comprising:
    requesting, via a boot manager of a host module, a hardware security module (HSM) to verify an application software of the host module;
    receiving a programming session request at the HSM and flagging the programming session request at the host module to request execution of a bootloader of the host module;
    in response to the programming session request, resetting a microcontroller and verifying the bootloader by the HSM in response to the programming session request;
    configuring, via the verified application software, a memory protection unit (MPU) to at least one of no execute and no write for at least one area of a memory of the host module;
    executing the application software with the HSM enabled;
    disabling a protection feature of the HSM, the protection feature being configured to protect the memory of the host module;
    executing the programming session request to modify the memory of the host module and update the application software using the verified bootloader; and
    resetting the microcontroller including the HSM and the host module to execute the updated application software of the host module.

11. The system of claim 10, wherein configuring the MPU includes setting a stack area and a data area to no execute and setting a holding area to no write and no execute.

12. The system of claim 11, wherein setting the holding area of the memory includes setting a first holding area to no write and no execute and a second holding area to no write and no execute, the first holding area defined between the stack area and the data area and the second holding area defined between the data area and a code area.

13. The system of claim 10, further including initiating the host module and preventing, via the HSM, modification of the memory of the host module by the host module.

14. A vehicle comprising:
an electronic control unit (ECU) configured to receive programming session requests including executable code; and
a microcontroller communicatively coupled to the ECU and including data processing hardware and memory hardware, the memory hardware storing a hardware security module (HSM), a host module, and a memory protection unit (MPU), the HSM configured to cause the data processing hardware to perform operations including:
initiating the host module, the host module including a boot manager, a bootloader, and application software;
determining, via the boot manager, which of the bootloader and the application software to execute;
verifying, via the HSM, at least one of the bootloader or the application software;
configuring, via one of the bootloader and the application software, the memory protection unit (MPU) to at least one of no write or no execute for at least one area of a memory of the host module;
executing one of the bootloader and the application software via the host module;
executing a programming session request to modify the memory of the host module and update the application software of the host module using the verified at least one of the bootloader or the application software; and
resetting a microcontroller including the HSM and the host module to execute the updated application software of the host module.

15. The vehicle of claim 14, further including receiving, at the HSM, and verifying, via the HSM, the programming session request including the executable code and verifying at least one of the bootloader or the application software includes verifying the bootloader via the HSM in response to the programming session request.

16. The vehicle of claim 15, wherein initiating the host module includes restricting, via the HSM, modification permissions of the memory of the host module.

17. The vehicle of claim 14, wherein configuring the MPU includes setting a stack area and a data area of the memory of the host module to no write and no execute and setting a holding area to no write and no execute, the holding area defined between the stack area and a code area of the memory of the host module.

* * * * *